Feb. 24, 1942.   H. C. EDWARDS   2,274,609
FUEL METERING AND TIMING GOVERNOR FOR INJECTION
INTERNAL COMBUSTION ENGINES
Filed Oct. 6, 1939   5 Sheets-Sheet 4

INVENTOR:
H. C. Edwards
HIS ATTORNEY.

Patented Feb. 24, 1942

2,274,609

UNITED STATES PATENT OFFICE 2,274,609

FUEL METERING AND TIMING GOVERNOR FOR INJECTION INTERNAL COMBUSTION ENGINES

Herbert C. Edwards, Massillon, Ohio, assignor to The Timken Roller Bearing Company, Canton, Ohio, a corporation of Ohio Application October 6, 1939, Serial No. 298,270

15 Claims. (Cl. 123—140)

This invention relates principally to fuel pump metering and timing systems for compression ignition engines. The invention has for its principal object to provide a single governor for automatically controlling in accordance with the speed of the engine both the quantity and the time of the fuel injection. Another object is to provide a completely enclosed, self-contained fuel metering and timing governor which can be readily applied to the engine and to the pump and which will form a support for the latter. Another object is to provide for adjusting the governor for any desired speed. Another object is to enable the fuel supply to be cut off in any speed adjustment of the governor. Another object is to provide for initially adjusting the point of fuel cutoff and the timing of the injection. Another object is to provide for adjusting the maximum fuel feed at any desired speed. Other objects are to provide for simplicity and cheapness of construction and ease of assembly and adjustment of the parts. The invention consists in the governor and in the construction and combinations and arrangements of parts hereinafter described and claimed.

In the accompanying drawings, which form part of the specification and wherein like symbols refer to like parts wherever they occur, Fig. 6 is a vertical longitudinal section through said governor, one end of the fuel pump being shown supported on said governor with its cam shaft and fuel control rod operatively connected therewith, Fig. 11 is a vertical longitudinal section on the line 11—11 in Fig. 7, Fig. 12 is a fragmentary cross-section on the line 12—12 in Fig. 13, Figs. 13 and 14 are enlarged fragmentary sections on the line 13—13 in Fig. 9 showing the parts in different positions of adjustment, Fig. 15 is a vertical cross-section on the line 15—15 in Fig. 8, Figs. 16, 17 and 18 are detailed perspective views of the rotary cam supporting plate, cam and cam operating link, respectively.

Figure 1:
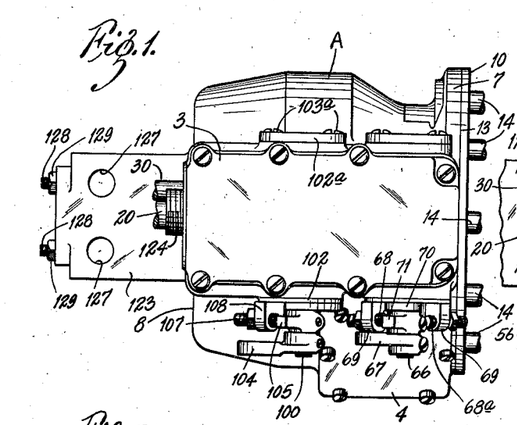
Fig. 1 is a plan view of a governor embodying my invention.
Figure 2:
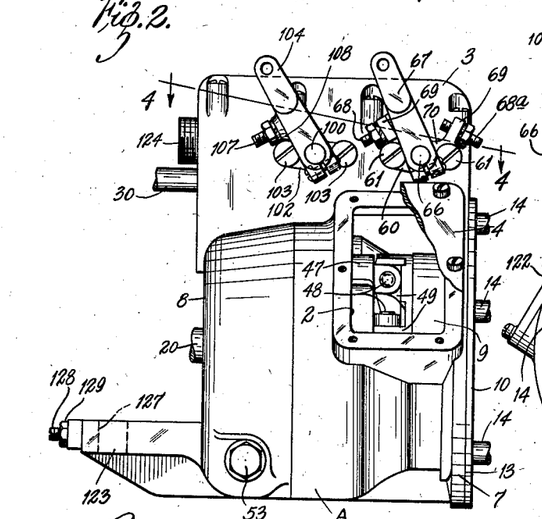
Fig. 2 is a side elevation of said governor.
Figure 3:
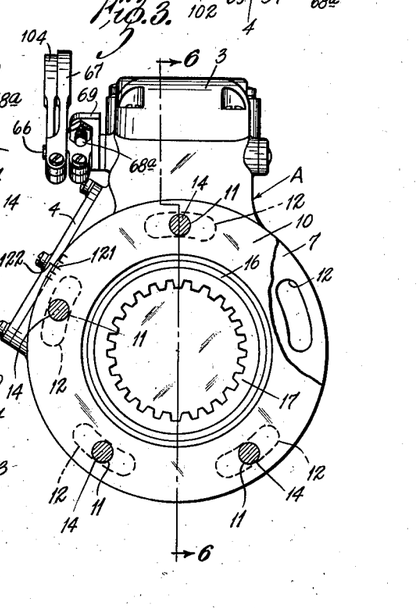
Fig. 3 is a view of the engine opposing end of said governor.
Figure 4:
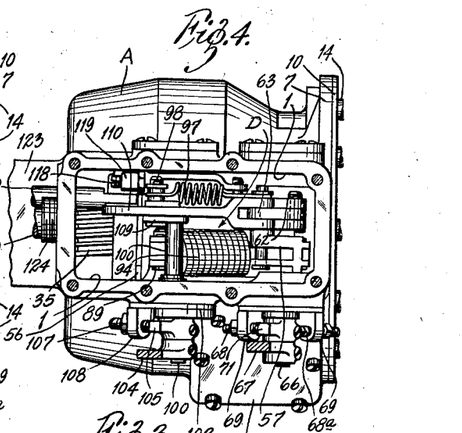
Fig. 4 is a section on the line 4—4 in Fig. 2.
Figure 5:
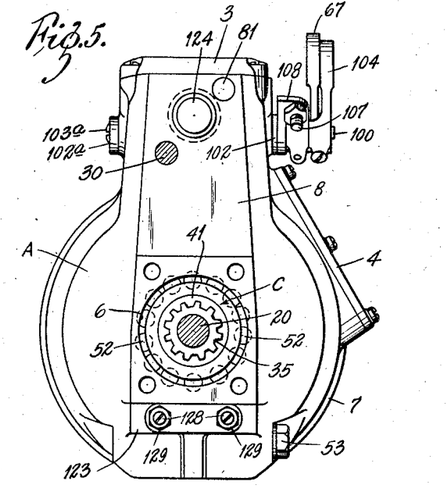
Fig. 5 is a view of the pump opposing end of said governor.
Figures 6, 11, 16, 17, 18:
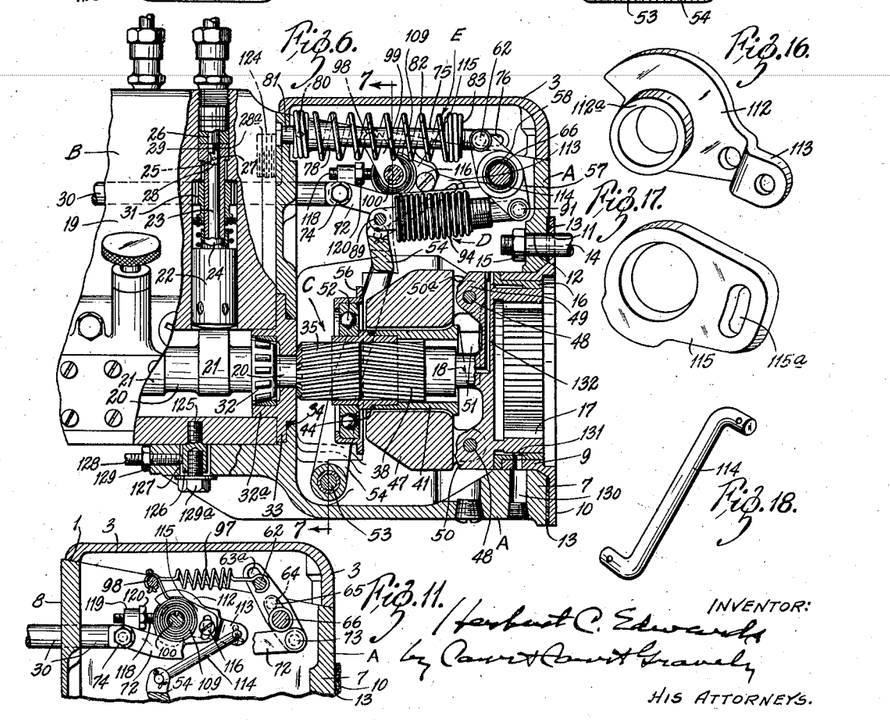
Figure 7:
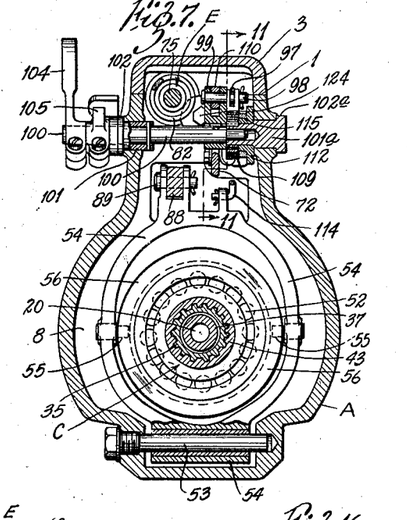
Fig. 7 is a vertical cross-section on the line 7—7 in Fig. 6.
Figures 8, 9:
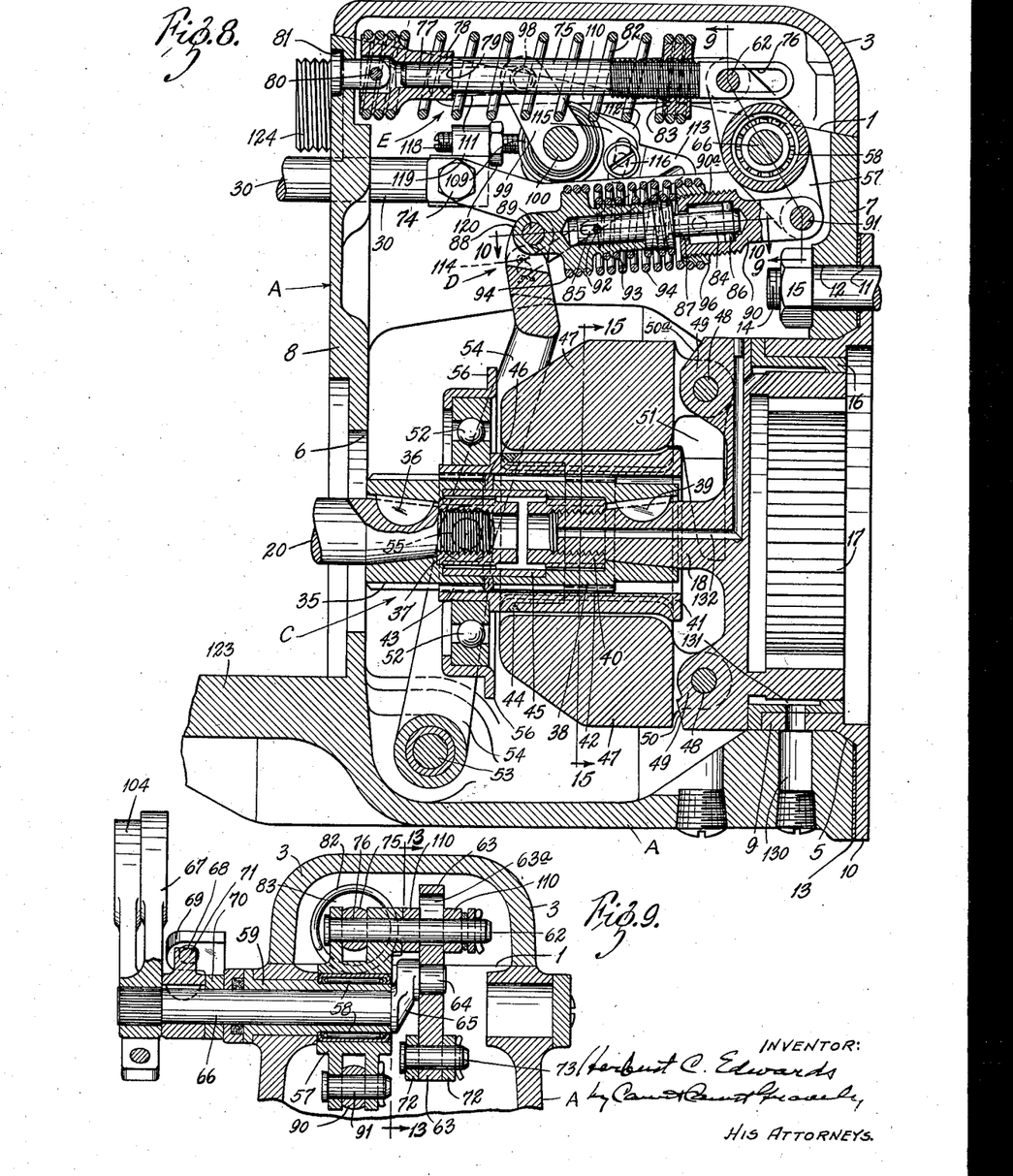
Fig. 8 is an enlarged section similar to Fig. 6 with the high speed timing springs shown in longitudinal section.
Fig. 9 is the vertical cross-section through the upper portion of the governor housing on the line 9—9 in Fig. 8.
Figure 10:
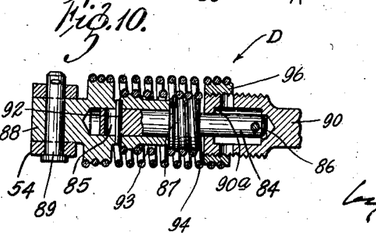
Fig. 10 is a fragmentary section through the timing springs and link on the line 10—10 in Fig. 8.
Figures 12, 13, 14, 15:
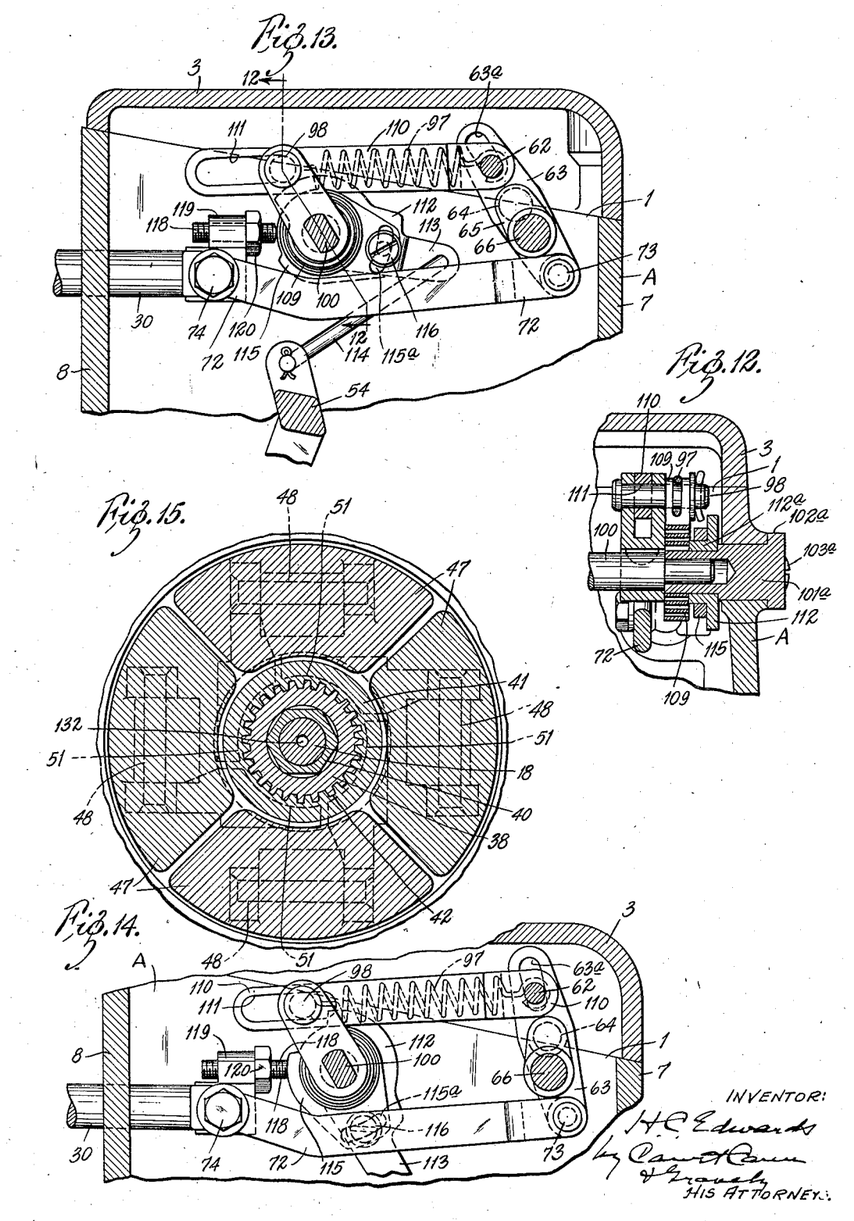

My fuel pump metering and timing governor comprises a housing A adapted to be secured at one end to the compression ignition engine (not shown), whose speed is to be controlled, and at the other end to a pump B for supplying fuel to said engine. Said governor housing has rectangular top and side openings 1 and 2, which are closed by removable covers 3 and 4, respectively, and axially alined circular openings 5 and 6 in its respective engine and pump opposing end walls 7 and 8. As shown in Figs. 6 and 8, a cylindrical sleeve 9 fits within the opening 5 in the end wall 7 of the governor housing and has an outstanding flange 10 at its outer end that has a circular series of equally spaced circular openings 11 therein adapted to register with a similar series of arcuate openings 12 that extend through said end wall around said opening. A gasket 13 is interposed between the outstanding flange 10 of the sleeve 9 and the end wall 7 of the housing; and suitable threaded studs 14 rigid with the engine extend through the holes 11 in said flange and the arcuate slots 12 in said wall and have nuts 15 threaded thereon that abut against the inner face of said wall and clamp said wall, gasket and flange together and to said engine.

Pressfitted in the sleeve 9 is a bushing 16 in which is rotatably supported an internal gear 17 adapted to be intermeshed with a gear (not shown) driven by or in unison with the engine. The internal gear 17 has a spindle portion 18 projecting axially from the inner end thereof that extends into the governor housing and is operatively connected with fuel pump B by an angularly adjustable coupling C enclosed in said housing. As shown in Fig. 6, the fuel pump B is of the well known jerk type, including a housing 19 containing the shaft 20 having a tappet or cam 21 thereon that actuates a tappet cup 22 that is reciprocable in said housing and, in turn, actuates a spring retracted plunger or piston 23 that reciprocates in a cylinder 24 in said housing. The cylinder 24 is provided with two ports, an inlet port 25 and an overflow port (not shown); and a valved discharge passageway 26 leads from the compression chamber 27 of said cylinder to the engine cylinder supplied thereby. The pump plunger 23 has an annular groove 28 therein that communicates with the compression chamber of the cylinder 24 through a longitudinal groove 29, whereby delivery of the fuel begins as soon as said plunger covers the inlet and overflow ports and ends when the annular groove 28 of said plunger is placed in communication with the overflow port. The annular groove 28 is provided with a helical upper edge 28a, whereby the effective feed stroke of the pump plunger may be regulated to accurately meter the fuel charge by turning said plunger in its cylinder. The plunger turning mechanism comprises a rod 30 that is reciprocable in a horizontal bore provided therefor in the pump housing 19 and has a rack thereon that cooperates with the teeth of a sleeve 31 that has suitable axially slidable but non-rotary connection with said plunger. This jerk type of fuel injection pump is well known and it is considered unnecessary to illustrate it in detail.

The governor opposing end of the pump shaft 20 is journaled in a roller bearing 32 mounted in a sleeve 32a that fits within an opening in the adjacent end wall of the pump housing and has a shouldered outstanding flange 33 at its outer end that is secured to said end wall and fits within the similarly shouldered opening 6 in the adjacent end wall 8 of the governor housing A. A sealing ring 34 of rubber or other suitable material is sleeved on the shouldered portion of the flange 33 and is compressed between said flange and the shouldered wall of the opening 6. The pump shaft 20 extends beyond the flanged outer end of the bearing supporting sleeve 32a into the governor housing where it is connected to the internal gear 17 in the opposite ends of said housing by the angularly adjustable shaft coupling C.

As shown in the drawings, the coupling C preferably comprises a left hand helical gear 35 fixed to the end of the pump shaft by a key 36 and a nut 37, a right hand helical gear 38 fixed to the end of the axial spindle 18 of the internal gear 17 by a key 39 and a nut 40, and an axially slidable sleeve 41 surrounding said gears and having helically disposed internal teeth 42 and 43 at its opposite ends meshing with the right and left hand gears, respectively. For convenience of manufacture and assembly, the axially slidable timing sleeve 41 is preferably made in two sections that are welded together, as at 44. The adjacent ends of the left and right hand helical gears 35 and 38 are piloted on a sleeve 45 disposed therein; and a spacer ring 46 is interposed between the adjacent ends of said gears and between the two longitudinally spaced internal gears 42 and 43 of the sleeve 41 to thereby limit the axial sliding movement of said sleeve.

Both the fuel control rod 30 and the timing coupling are automatically controlled by a single governing device preferably in the form of a centrifugal governor comprising four centrifugal levers or fly weights 47 that are pivotally supported on the internal gear 17 for swinging movement towards and away from the timing sleeve 41 on pivots 48 journaled in outstanding bearings or lugs 49 on the pump opposing end face of said gear. These lugs are provided at their outer corners with inclined abutment faces that limit the outward swinging movement of the centrifugal levers 47, two of these faces 50 being disposed at a steeper inclination than the other faces 50a thereby preventing the two levers that cooperate with two faces 50 from swinging outwardly as far as the two levers that cooperate with the faces 50a. Each of the centrifugal levers 47 is provided adjacent to its pivoted end with an inwardly extending finger 51 whose free end is adapted to abut against the adjacent, internal gear opposing end of the axially slidable timing sleeve 41 to shift the same in the direction of the pump shaft 20 when said levers swing outwardly due to centrifugal force.

Mounted upon the pump opposing end of the timing sleeve 41 beyond the centrifugal levers 47 is a suitable ball thrust bearing 52 adapted for axial movement with said sleeve.

Pivoted on a horizontal shaft 53 that extends from side wall to side wall of the governor housing below the thrust bearing 52 is an upright arm 54 which has an opening therethrough adapted to loosely receive said bearing and is provided with horizontal pins 55 that extend into said opening from opposite sides thereof and are adapted to bear against the pump opposing face of an outstanding peripheral flange 56 on said bearing at diametrically opposite points. The upper end of the yoke arm 54 has an extensible link connection D with the lower arm of the rock lever 57 that is journaled on a suitable roller bearing 58 that is mounted on the inner end of a bushing 59 that extends through a horizontal opening provided therefor in one side wall of the governor housing above the internal gear 17 and has diametrically opposed outstanding ears 60 that are rigidly secured flatwise to the outer face of said side wall by means of cap screws 61. The upper arm of the rock lever 57 carries a horizontal pin 62 that extends from one side thereof through an elongated slot 63a provided therefor in the upper arm of a second rock lever 63 that is journaled intermediate between its ends on a horizontal pin 64 on the crank arm 65 on the inner end of a rock shaft 66 that is journaled in the bushing 59 that rotatably supports the rock lever 57. The rock or crank shaft 66 extends outwardly beyond the outer end of the bushing 59 and has an operating or control lever 67 fixed thereto. Swinging movement of the control lever 67 is limited by a pair of stop screws 68 68a that are threaded through lugs 69 provided therefor on a plate 70 that is secured flatwise to the outer end of the bushing 59 by means of the securing screws 61 therefor. These stop screws are adapted to be engaged by the radial lug 71 that is secured to the control shaft 66 for swinging movement between the two stop screws. The lower arm of the rock lever 63 is secured to the fuel control rod 30 of the pump, by a link 72, one end of which is pivotally secured, as at 73, to said arm of said lever and the other end of which is pivotally secured by means of a bolt 74 to said control rod which extends into the governor housing through an opening provided therefor in the end wall thereof.

The upper arm of the rock lever 57 is connected to the end wall 8 of the governor housing by means of an extensible link E. This extensible link comprises a main section or rod 75 that has a slot-and-pin connection at one end with the upper arm of the rock lever 57, said connection comprising an elongated slot 76 in said rod and the pin 62 that connects the upper arms of the rod levers 57 and 63. The other end of the rod 75 is reduced, as at 77 to fit within an axial bore or socket provided therefor in the other section or member 78 of said link, the reduced end portion of the rod forming a shoulder 79 which limits the movement of the two sections towards each other. This member 78 is secured by a horizontal pivot pin 80 to an anchor member 81 that is mounted in an opening in the pump opposing end wall 8 of the governor housing. The rod 75 is normally held in abutting relation to the pivoted support 78 therefor by means of a coil tension spring 82 which has one end seated in periphrel grooves provided therefor in said pivoted support and has its other end seated in similar peripheral grooves provided therefor in a nut member 83 that is threaded on said rod for movement longitudinally thereof to thereby adjust the tension of said spring.

The link connection D between the governor actuated yoke arm 54 and the lower arm of the rock layer 57 comprises a rod 84 having an elongated slot 85 near one end and a diametrical pin 86 adjacent to its other end. The rod 84 is enlarged, as at 87, intermediate between its ends, the portion of the rod on one side of such enlargement being slidably supported in the bore of an end fitting 88 that is pivotally secured, as at 89, to the upper end of the yoke arm 54; and the portion of said rod on the opposite side of its enlarged middle portion being slidably supported in the bore of an end fitting 90 that is pivoted, as at 91, to the lower arm of the rock lever 57. The rod supporting bore of the end fitting 90 is enlarged intermediate between its ends to receive the projecting ends of the cross pin 86 and to form an abutment shoulder 90a therefor for limiting endwise separation of said end fitting and the end fitting 88. The other end fitting 88 has a cross pin 92 therein that extends through the slot 85 in the rod 84 and serves to limit endwise separation of said fitting and rod.

The two end fittings are normally held in abutting relation to the enlarged middle portion of the rod or link 84 by means of inner and outer coiled tension springs 93 and 94, respectively. One end of the outer spring 94 is seated in peripheral grooves provided therefor in the end fitting 88 and the other end is seated in similar peripheral grooves provided therefor in a member 96 that is threaded on the other end fitting 90 so as to be adjustable longitudinally thereof to vary the tension of said spring. The other or inner spring 93 has one end seated in peripheral grooves provided therefor in the end fitting 88 and its other end seated in peripheral grooves provided therefor in enlarged middle portion of the rod 84. By this arrangement, the extensible link D operates either as a solid link or as an extensible link depending on the pull thereon.

A tension coil spring 97 serves to hold the pin 62 on the upper end of the rock lever 57 in the inner end of the slot 76 in the rod 75 of the high speed link E, the yoke arm 54 in engagement with the thrust bearing 52, and the timing sleeve 41 in engagement with the finger 51 of the governor weights 47. This spring is connected at one end to the pin 62 and at the other end to a pin 98 carried on the free upper end of an arm 99 fixed to a horizontal shaft 100 that is disposed crosswise of the housing at about the level of the control shaft 66 with its ends journaled in bushings 101, 101a that are mounted in horizontal openings provided therefor in the respective side walls of the governor housing. These housings have flanged outer ends, 102 and 102a, respectively, that are secured by cap screws 103 and 103a to the governor housing. The shaft 100 extends outside of the governor housing on the control lever side thereof and has a manually operable lever 104 fixed thereto. Fixed to said shaft of the lever 104 is a radially extending lug 105 that is adapted to engage a stop screw 107 carried by a plate 108 that is secured to the housing by the securing screws 103 for the bushing 101. This stop screw serves to limit the swinging movement of the top lever 104 in an anti-clockwise direction. Mounted on the stop lever shaft 100 supporting bushing 101a is a spiral torsion spring 109 having its inner end anchored to said bushing and its other outer end hooked around the pin 98 on the outer end of the rock arm 99. This torsion spring serves to rotate the arm 99 in an anti-clockwise direction against the tension of the idling spring 97 and thus hold the stop lever 104 against the stop screw 107. The arm 99 fixed to the stop lever shaft 100 is also connected to the upper end of the rock lever 63 by means of a link 110, one end of which has a slot-and-pin connection with the upper end of said arm comprising an elongated slot 111 in said link and the pin 98 on said arm. The other end of said link is bifurcated to straddle the upper end of the rock lever 63 and is pivotally secured thereto by means of the pin 62 that extends through the slot 63a therein.

Journaled on the stop shaft supporting bushing 101a between the torsion spring 109 and the adjacent side wall of the governor housing is a plate 112 having a radially extending arm 113 that is connected by means of a link 114 to the upper end of the yoke arm 54. Journaled on the hub portion 112a of the rotary plate 112 is an edge cam 115 that is secured to said plate in the desired position of rotary adjustment relative thereto by means of a cap screw 116 that extends through an arcuate slot 115a in said cam and is threaded into an opening provided therefor in said plate. The cam surface of the edge cam 115 is adapted to bear against one end of a screw 118 that is threaded through a fitting 119 that is secured to the rod fuel control 30 of the pump bolt 74 that pivotally secures the link 72 thereto. The screw 118 is provided with a nut 120 for locking it in the desired position of adjustment.

The outstanding flange 10 of the internal gear supporting sleeve 9 is provided with a mark 121 adapted to engage a mark 122 on the edge of the cover 4 for the side opening in the governor housing when the studs 14 which pass through the openings 11 in said flange are located midway between the ends of the elongated arcuate slots 12 in the engine opposing end wall 7 of said housing. These marks serve as a guide for indicating the position of the bolts in the slots; and the connected governor and pump units may be rotated relative to the sleeve 9 and studs 14 until the proper timing is obtained.

As shown in the drawings, the governor opposing end of the pump B is supported on a flange or bracket 123 that projects horizontally from the pump opposing end wall 8 of the governor housing adjacent to the lower corner thereof. In securing the pump and governor units together the rubber sealing ring 34 is placed around the shouldered portion of the flange 33 of the sleeve 32 that supports the pump shaft bearing 31 and the pump is secured to the governor by means of a screw 124 that extends through the upper portion of the end wall 6 of the governor housing and is threaded into the end wall of the pump housing. Threaded into the bottom of the pump housing are screws 125 whose heads or enlarged lower end portion 126 fit loosely in vertical holes 127 in the flange or horizontal pump supporting bracket 123 of the governor housing. Screws 128 are threaded into horizontal screw holes that lead inwardly from the end face of the bracket 123 and open into the vertical holes 127; and said screws press against the heads 126 of the screws 125 fixed to the pump housing to thereby force said housing in the direction of the governor housing and press the rubber sealing ring 34 tightly in place. The parts are then locked in this position by means of lock nuts 129 on the horizontal pressure screws 128 and by clamp screws 129a that are threaded into the lower end of the screws 125 with their heads bearing against the under side of the bracket 123.

The timing device, governor and internal gear bearing are lubricated by oil supplied to a vertical passageway 130 formed by registering holes in the bottom of the governor housing, sleeve 9 and bushing 16. This passageway opens into an annular passageway 131 formed between said bushing and the internal gear 17 journaled therein, and the oil is conveyed from this annular passageway to the interior of the timing coupling through a passageway 132 that leads from said annular passageway to the outer end of the axial spindle 18 of said internal gear.

The operation of the hereinbefore described fuel metering and timing governor is as follows: The governor is set for the desired engine speed by means of the manually operable control lever 67, whose swinging movement is limited by the two adjustable stop screws 68 and 68a which determine the respective minimum and maximum fuel feed of the pump. All four governor weights 47 act on the sleeve 41 of the angularly adjustable coupling C throughout the idling speed range of the engine, but from idling speed up to the top speed said sleeve is actuated by two of said weights only, the two other weights being held against outward swinging throughout the high speed range by the relatively steep abutment or stop surfaces 50 on the internal gear 17. During the outward swinging movement of all four weights the sleeve 41 is actuated thereby to swing the yoke arm 54 toward the pump and the link D serves as a rigid connection between said yoke arm and the rock lever 57 to swing the latter against the tension of the idling speed spring 97, such movement of said rock lever being limited by the engagement of the pin 62 on the upper end of said rock lever with the engine opposing end of the elongated slot 76 in the high speed adjusting link E. This pin, which passes through the elongated slot 63a in the rock lever 63 causes said lever to pivot on the crank pin 64 of the control lever shaft 66 and thus actuate the fuel control rod 30 through its link connection 72 therewith to thereby rotate the reciprocating pump plunger 23 and thus increase or decrease the quantity of injected fuel depending on the direction in which the control rod is shifted by the idling spring 97 or governor weights 47. During this movement of the parts no motion is imparted to the arm 99 on the stop lever shaft 100 due to the slot-and-pin connection 111, 98 between said arm and its link connection 110 with the pin 62 carried by the rock lever 57 and the spiral spring 109 which takes the reaction of the idling speed spring 97.

Above the idling speed range the position of the pin 62 is fixed due to the fact that the length of the high speed adjusting link E is fixed by the preloading of the high speed limit spring 82. As stated above, only two weights are operative throughout the high speed range to move the sleeve 41 towards and away from the pump to vary the angular relationship of the internal gear 17 and pump shaft 20 driven thereby and thus vary the timing of the beginning of the fuel injection according to the speed of the engine. The weights work against the timing springs 93, 94 and their position is determined by the force they exert to extend said springs; and these springs are calibrated to the timing requirements of the engine. Various springs may be provided to produce different timing characteristics. The timing link D can only be extended so far, when its length is again fixed by the engagement of the shoulder 90a with the diametrical pin 86 on the rod 84, such engagement occurring at top or full throttle speed of the engine. In the extended position of the timing link D, the force of the weights equals the preloading of the high speed limit spring 82 so that, regardless of the position of the pin 62, as determined by the setting of the control lever 67, as the weights move outwardly to a position where the force thereof exceeds the preloading of said high speed limit spring, said control rod will be moved to fuel cutoff position since at this time the rock lever 63 pivots on the crank pin 64 on the control lever shaft 66, thereby shifting the control rod opearting link 72 in the proper direction.

When the operator desires to stop the engine, the stop lever 104 is swung in a clockwise direction away from the adjustable stop screw 107 therefor, thus swinging the rock arm 99 on the stop lever shaft 100 in the same direction against the tension of the spiral spring 109. This movement of the arm 99 is transmitted through the link 110 to the pin 62, which swings about the axis of the control lever shaft 66 and, by reason of the engagement with the slot 63a in the rock lever 63 causes said rock lever to pivot on the crank pin 64 of said control lever shaft and, through its link connection 72 with the control rod 30, move said rod to fuel shutoff position. The spiral spring 109 engages the same pin 98 which attaches the idling spring 97 to the rock arm 99 on the stop lever shaft 100. This spiral spring is assembled loosely on its supporting bushing 101a and is wound up in a clockwise direction by rotating said bushing until the proper tension is obtained on said spring to withstand the reaction of the idling speed spring 97 which connects the rock arm 99 on the stop lever shaft 100 with the pin 62 carried by the rock lever 57 on the control lever shaft supporting bushing 59.

The desired maximum fuel feed of the control rod 30 of the pump is obtained by adjusting the screw 118 mounted on the end of said rod in abutting relation to the edge cam 115 fixed to the rotary plate 112 that is connected by the link 114 to the free upper end of the yoke arm 54. By this arrangement, any motion of the yoke arm 54 changes the position of the cam 115 relative to the screw 118 and in this way a cam profile can be selected by experiment so that a maximum quantity fuel can be supplied to the engine at any speed up to the border line of smoke limit of the engine. Whenever the yoke arm moves back and forth, it rotates the cam supporting plate 112; and, if a suitable mark, depending on the characteristics of the particular engine, is made on the inside of the housing to coincide with a mark on said plate at a predetermined speed, said marks will indicate the timing of the injection at any other speed, provided the proper adjustment of the cam supporting plate to the yoke arm 54 is made through the slot-and-screw connection on 115a, 116 between said plate and the edge cam 115.

Figures 19, 20, 21:
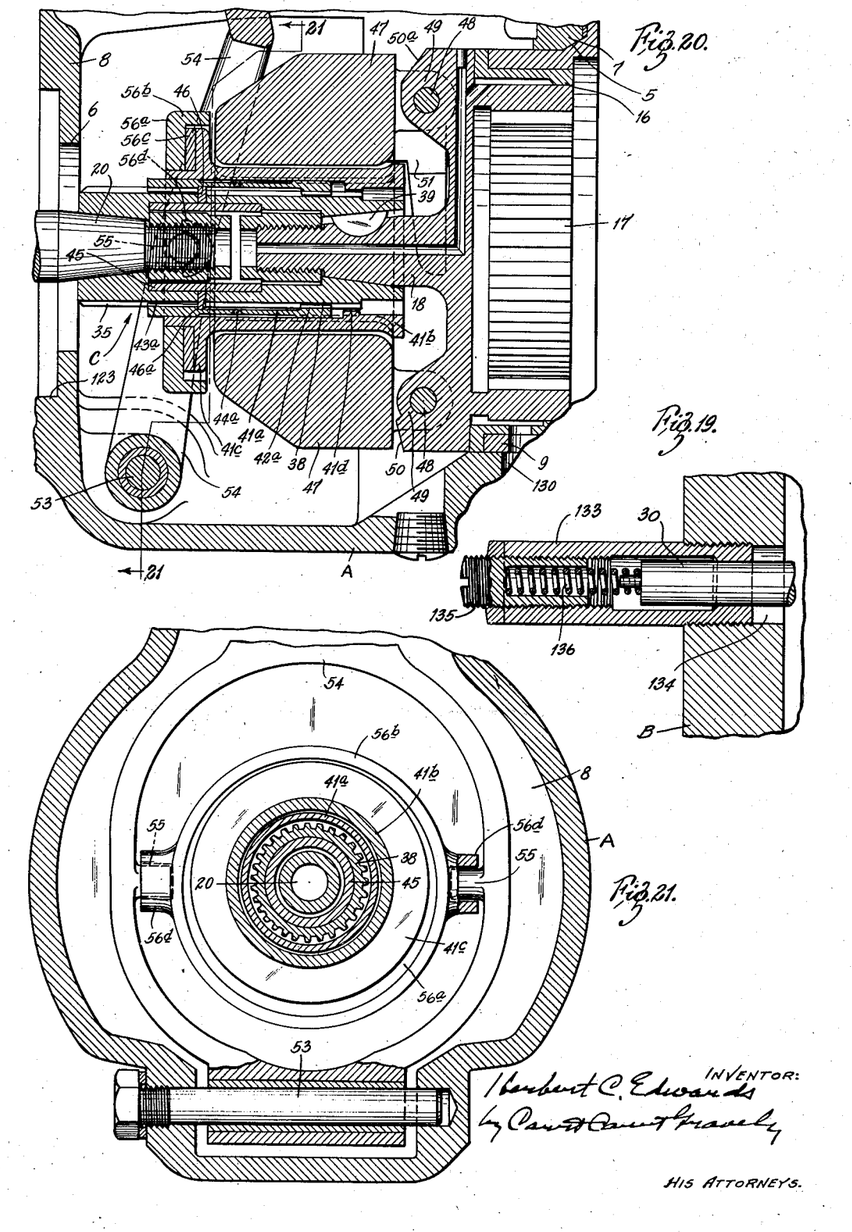
Fig. 19 is a fragmentary longitudinal sectional view of the pump through the end wall thereof remote from the governor, showing an arrangement for taking up lost motion or play in the lever system between the governor and the fuel control rod.
Fig. 20 is a fragmentary vertical section, similar to Fig. 8, showing a modified form of coupling for obtaining a constant or fixed timing of the fuel injection over the entire idling speed range of the engine.
Fig. 21 is a vertical transverse section on the line 21—21 in Fig. 20.

The hereinbefore described fuel metering and timing governor may be provided with suitable means for exerting a thrust on the lever system from the control rod 30 clear back to the centrifugal weights 47 so as to take up lost motion or play in the joints and pivots in said system and thus obtain immediate response to the movement of said weights. As shown in Fig. 19 of the drawings, a means for taking up such lost motion in the link and lever connection between the control rod 30 and the centrifugal weights may comprise a tubular housing 133 that is threaded into the outer end of a horizontal bore 134 that extends through the end wall of the pump B remote from the end wall thereof that abuts against the housing A of the metering and timing governor. The control rod 30 extends through the horizontal bore 134 and is slidably supported in the inner end of the tubular housing 133. Interposed between the end of the control rod and a cap screw 135 threaded into the outer end of the tubular housing 133 is a coil compression spring 136 which exerts an endwise thrust on the control rod, which thrust is transmitted through the lever system clear back to the centrifugal weights 47 of the governor, thereby taking up play or looseness in all the connecting pivots and joints of said system and enabling the movement of said weights to be transmitted through said system without any lost motion. When this lost motion spring 136 is used in connection with the idling speed spring 97 the total strength of the two springs must be the same as the strength of the spring 97 when used without the lost motion spring.

Some engines require a constant or fixed timing of the fuel injection during the entire idling speed range of the engine. In such case, the timing coupling is modified, as shown in Figs. 20 and 21, by means of a sleeve 41a that is mounted in the counterbored outer end portion of a governor actuated sleeve 41b and has helically disposed internal gear teeth 42a and 43a at its opposite ends meshing with the left and right hand gears, 35 and 38, respectively. For convenience of manufacture and assembly, the sleeve 41a is preferably made in two sections that are welded together, as at 44a; and the bore of the sleeve 41a is counterbored between the gears 42a and 43a thereof to provide an annular shoulder 46a which abuts against the spacing washer 46 and thus limits the inward sliding movement of said sleeve in the supporting bore of the weight actuated sleeve 41b.

Mounted on the outer end of the sleeve 41b beyond an outstanding flange 41c thereon is a cup-shaped thrust member 56a whose peripheral flange 56b extends rearwardly and overlaps the periphery of said outstanding flange, a suitable thrust washer 56c being interposed between said cup and said outstanding flange. The cup-shaped thrust member 56a is provided on its pump opposing face with radially disposed semi-cylindrical grooves 56d adapted to receive the diametrically opposed horizontal pins 55 of the upright yoke arm 54. As shown in Fig. 20, the inner end of the sleeve 41a terminates short of an annular shoulder 41d formed by the inner end of the counterbore of the sleeve 41b, thereby permitting limited outward sliding movement of the sleeve 41b under the influence of the centrifugal weights 41b without actuating the timing sleeve 41a, the length of such limited movement corresponding to the idling speed range of the engine. When the shoulder 41d at the inner end of the counterbore in the sleeve 41b abuts against the inner end of the timing sleeve 41a, outward sliding movement is imparted to the latter thus causing relative rotary movement between the pump shaft and the drive shaft therefor and thereby varying the timing of the beginning of the fuel injection according to the speed of the engine above the idling speed range thereof.

Obviously, the hereinbefore described governor admits of considerable modification without departing from the invention. Therefore, I do not wish to be limited to the precise arrangement shown and described.

What I claim is:

1. A fuel injection system for an internal combustion engine including a fuel injection pump having means for varying the quantity of the fuel injection, a shaft driven by said engine, a centrifugal governor driven by said shaft, an angularly adjustable coupling between said shaft and said pump and operable by said governor to automatically vary the time of said fuel injection in accordance with the speed of the engine throughout the entire speed range thereof, an operative connection between said coupling and said fuel quantity varying means whereby the latter is operable by said governor through said coupling and said connection to automatically vary the quantity of the fuel injection in accordance with the speed of the engine throughout the idling speed range and above the full load speed thereof only, and means for manually operating said fuel quantity varying means through said connection to vary the quantity of the fuel injection between idling and full load speeds of said engine.

2. A fuel injection system for an internal combustion engine including a fuel injection pump having means for varying the quantity of the fuel injection, a shaft driven by said engine, a centrifugal governor driven by said shaft, an angularly adjustable coupling forming a driving connection between said shaft and said pump and operable by said governor to automatically vary the time of the fuel injection in accordance with the speed of said engine over all speed ranges thereof except the idling speed range; a connection between said coupling and said fuel quantity varying means whereby the latter is operable by said governor through said coupling and said connection to automatically vary the quantity of the fuel injection in accordance with the speed of the engine throughout the idling speed range of the engine and above the full load speed thereof only, and a means for manually operating said fuel quantity varying means through said connection to vary the quantity of the fuel injection between idling and full load speeds of the engine.

3. A fuel injection system for internal combustion engines including a fuel injection pump having a shaft and a member for varying the volume of the fuel injected, a shaft driven by said engine, a centrifugal governor driven by said engine driven shaft, an angularly adjustable coupling connecting said pump shaft and engine driven shaft and operable by said governor to change the relative angular relationship of said shafts to thereby vary the timing of the fuel injection in accordance with the speed of the engine, and a connection between said coupling and said fuel quantity varying means whereby the latter is operable by said governor through said coupling and said connection to vary the volume of the fuel injection in accordance with the speed of the engine.

4. A speed governor for internal combustion engines including an adjustable fuel control member and a shaft driven by said engine, a rock lever for actuating said fuel control member, a spring cooperating with one arm of said rock lever for urging said control member in a direction of increased fuel feed, a pivoted arm, a link connection between said pivoted arm and the other arm of said rock lever, governor means responsive to the speed of said shaft and cooperating with said pivoted arm to actuate the same against the tension of said spring, and means for limiting the movement of said rock lever in the direction of reduced fuel feed, said limiting means being yieldable at a predetermined speed of said shaft, whereby said governor means operates to swing said rock lever beyond said limit established by said limiting means and thus move said fuel control member to fuel cut-off position.

5. A speed governor for internal combustion engines including an adjustable fuel control member and a shaft driven by said engine, a rock lever for actuating said fuel control member, a spring cooperating with said rock lever for urging said control member in a direction of reduced fuel feed, a pivoted arm, a link connection between said pivoted arm and said rock lever, governor means responsive to the speed of said shaft and cooperating with said arm to actuate the same against the tension of said spring, means for limiting the movement of said rock lever in the direction of reduced fuel feed, said limiting means being yieldable at a predetermined high speed of said shaft, whereby said governor means operates to swing said rock lever beyond the limit established by said limiting means and thus shift said fuel control member to fuel cut-off position, and manually operable means for varying the position of said fuel feed control member relative to said governing means.

6. A speed governor for internal combustion engines including an adjustable fuel control member and a shaft driven by said engine, a rock lever for actuating said fuel control member, a spring cooperating with said rock lever for urging said control member in the direction of increased fuel feed, a pivoted arm, a link connection between said pivoted arm and said rock lever, governor means responsive to the speed of said shaft and cooperating with said arm to actuate the same against the tension of said spring, an elongatable link for limiting the movement of said rock lever in the direction of reduced fuel feed, said link being elongated at a predetermined speed of said shaft, whereby said governor means operates to swing said rock lever beyond the reduced fuel feed limit established by said link and thus move said fuel control member to fuel cut-off position, manually operable means for varying the position of said fuel feed control member relative to said governing means, and manually operable means for moving said fuel feed control member to fuel cut-off position in all positions of said rock lever.

7. A speed governor for internal combustion engines including a fuel pump having a cam shaft and an adjustable fuel control member, a shaft driven by said engine and an angularly adjustable coupling connecting said shafts, a rock lever for actuating said fuel control member, a spring cooperating with said rock lever for urging said control member in the direction of increased fuel feed, a pivoted arm, a link connection between said pivoted arm and said rock lever, and governor means responsive to the speed of said engine driven shaft and cooperating with said arm and said coupling to actuate the same against the tension of said spring in accordance with the speed of the engine driven shaft.

8. A speed governor for internal combustion engines including a fuel pump having a cam shaft and an adjustable fuel control member, a shaft driven by said engine and an angularly adjustable coupling connecting said shafts, a rock lever for actuating said fuel control member, a spring cooperating with said rock lever for urging said control member in the direction of increased fuel feed, a pivoted arm, a link connection between said pivoted arm and said rock lever, governor means responsive to the speed of said engine driven shaft and cooperating with said pivoted arm and said coupling to actuate the same against the tension of said spring, said link comprising spring connected sections whereby said link is adapted to elongate at a predetermined speed of said engine driven shaft.

9. A speed governor for internal combustion engines including an adjustable fuel control member and a shaft driven by said engine, a rock lever for actuating said fuel control member, a spring cooperating with said rock lever for urging said control member in a direction of increased fuel feed, a pivoted arm, a link connection between said pivoted arm and said rock lever, governor means responsive to the speed of said shaft and cooperating with said arm to actuate the same against the tension of said spring, said link connection comprising spring connected sections adapted to permit limited elongation of said link at a predetermined speed of said engine driven shaft, a second link for limiting the swinging movement of said rock lever in the direction of reduced fuel feed, said second link being adapted to elongate at a predetermined speed of said shaft, whereby said governor means operates to swing said rock lever beyond the reduced fuel feed limit established by said second link and thus move said fuel control member to fuel cut-off position.

10. A speed governor for internal combustion engines including an adjustable fuel feed member and a shaft driven by said engine, a rock lever, a pivoted arm, a yieldable connection between said pivoted arm and one arm of said rock lever, a spring cooperating with the other arm of said rock lever for yieldably resisting movement thereof in one direction, governor means responsive to the speed of said shaft and cooperating with said pivoted arm to actuate the same against the tension of said spring, a second rock lever disposed alongside of said first mentioned rock lever for pivotal movement on an axis parallel to the pivotal axis of said first mentioned rock lever, a pin carried by said other arm of said first mentioned rock lever and extending into an elongated slot provided therefor in the corresponding arm of said second rock lever, a link connection between the other arm of said second rock lever and said adjustable fuel feed member, an extensible spring retracted link having one end fixed and its other end slotted to receive said pin, and means for shifting the pivotal axis of said second rock lever to cause the latter to turn about said pin and thereby change the fuel feed setting of said adjustable fuel feed member.

11. A speed governor for internal combustion engines including an adjustable fuel feed member and a shaft driven by said engine, a rock lever, a pivoted arm, a yieldable connection between said pivoted arm and one arm of said rock lever, a spring cooperating with the other arm of said rock lever for yieldably resisting movement thereof in one direction, governor means responsive to the speed of said shaft and cooperating with said pivoted arm to actuate the same against the tension of said spring, a second rock lever disposed alongside of said first mentioned rock lever for pivotal movement on an axis parallel to the pivotal axis of said first mentioned rock lever, a pin carried by said other arm of said first mentioned rock lever and extending into an elongated slot provided therefor in the corresponding arm of said second rock lever, a link connection between the other arm of said second rock lever and said adjustable fuel feed member, an extensible spring retracted link having one end fixed and its other end slotted to receive said pin, means for shifting the pivotal axis of said second rock lever to cause the latter to turn about said pin and thereby change the fuel feed setting of said adjustable fuel feed member, and manually operable means operatively engaging said second rock lever for actuating the same to shift the fuel feed member controlled thereby to fuel shut-off position.

12. A speed governor for internal combustion engines including a pump having an adjustable fuel feed member and a rotary cam shaft, a shaft driven by said engine and an angularly adjustable driving connection between said shafts, a rock shaft, a rock lever journaled thereon, a pivoted arm, a yieldable connection between said pivoted arm and one arm of said rock lever, a spring cooperating with the other arm of said rock lever for yieldably resisting movement thereof in one direction, governor means responsive to the speed of said shaft and cooperating with said pivoted arm to actuate the same against the tension of said spring, said rock shaft having an eccentric pin, a second rock lever journaled on said eccentric pin, a connecting pin fixed to said other arm of said first mentioned rock lever and extending into an elongated slot provided therefor in the corresponding arm of said second rock lever, a link connection between the other arm of said second rock lever and said adjustable fuel feed member, and an extensible spring retracted link having one end fixed and its other end slotted to receive said pin, and means for turning said rock shaft to shift the pivotal axis of the rock lever journaled on the eccentric pin thereof to thereby cause said eccentrically mounted rock lever to turn about said connecting pin and change the fuel feed setting of said adjustable fuel feed member.

13. A speed governor for internal combustion engines including an adjustable fuel feed member and a shaft driven by said engine, a rock lever, a pivoted arm, a yieldable connection between said pivoted arm and one arm of said rock lever, a spring cooperating with the other arm of said rock lever for yieldably resisting movement thereof in one direction, governor means responsive to the speed of said shaft and cooperating with said pivoted arm to actuate the same against the tension of said spring, a second rock lever disposed alongside of said first mentioned rock lever for pivotal movement on an axis parallel to the pivotal axis of said first mentioned rock lever, a pin carried by said other arm of said first mentioned rock lever, and extending into an elongated slot provided therefor in the corresponding arm of said second rock lever, a link connection between the other arm of said second rock lever and said adjustable fuel feed member, an extensible spring retracted link having one end fixed and its other end slotted to receive said pin, means for shifting the pivotal axis of said second rock lever to cause the latter to turn about said pin and thereby change the fuel feed setting of said adjustable fuel feed member, and a stop for limiting the movement of said fuel feed member in the direction of increased fuel feed, said stop comprising a rotatably mounted cam disposed in abutting relation to said fuel feed member and operatively connected to said pivoted arm to be actuated thereby.

14. A speed governor for internal combustion engines including an adjustable fuel feed member and a shaft driven by said engine, manually operable spaced parallel control and stop shafts, a rock lever journaled on said control shaft, a pivoted arm, a yieldable connection between said pivoted arm and one arm of said rock lever, a spring cooperating with the other arm of said rock lever for yieldably resisting movement thereof in one direction, governor means responsive to the speed of said engine driven shaft and cooperating with said pivoted arm to actuate the same against the tension of said spring, said control shaft having an eccentrically disposed pin thereon, a second rock lever journaled on said eccentric pin, a connecting pin fixed to said other arm of said first mentioned rock lever and extending into an elongated slot provided therefor in the corresponding arm of said second rock lever, a link connection between the other arm of said rock lever and said adjustable fuel feed member, an extensible spring retracted link having one end fixed and its other end slotted to receive said connecting pin, an arm rigid with said stop shaft, a link connection between said stop shaft arm and said connecting pin, whereby said rock levers are movable independently of said stop shaft arm, a stop for limiting the swinging movement of said stop shaft arm away from said control shaft, and means for yieldably holding said stop shaft arm in the position fixed by said stop.

15. A speed governor for internal combustion engines including an adjustable fuel feed member and a shaft driven by said engine, manually operable spaced parallel control and stop shafts, a rock lever journaled on said control shaft, a pivoted arm, an extensible spring retracted link connection between said pivoted arm and one arm of said rock lever, governor means responsive to the speed of said engine driven shaft and cooperating with said pivoted arm to actuate the same, said control shaft having an eccentrically disposed pin thereon, a second rock lever journaled on said eccentric pin, a connecting pin fixed to said other arm of said first mentioned rock lever and extending into an elongated slot provided therefor in the corresponding arm of said second rock lever, a link connection between the other arm of said rock lever and said adjustable fuel feed member, an extensible spring retracted link having one end fixed and its other end slotted to receive said connecting pin, an arm rigid with said stop shaft, a spring connecting said connecting pin with said stop shaft arm, a link pivotally connected at one end to said connecting pin and having a slot-and-pin connection at its other end with said stop shaft arm permitting movement of said first mentioned rock lever independently of said stop shaft arm, an adjustable stop for limiting the swinging movement of said stop shaft arm away from said control shaft, and a spring operating against the tension of said first mentioned spring for holding said stop shaft arm in the position established by said stop.

HERBERT C. EDWARDS.